Aug. 11, 1936.   O. VON DER HEYDE   2,050,869
SEPARABLE INTERLOCKING FASTENER
Filed Nov. 15, 1933
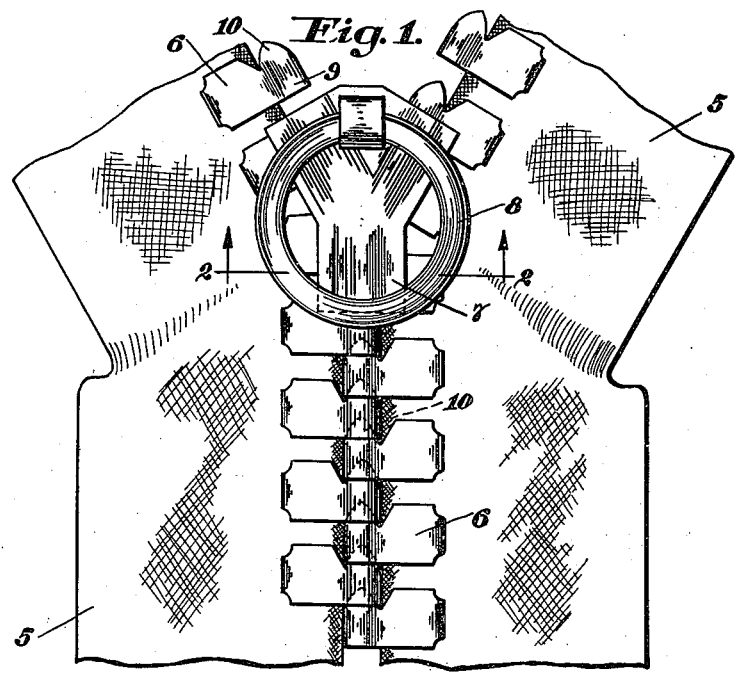
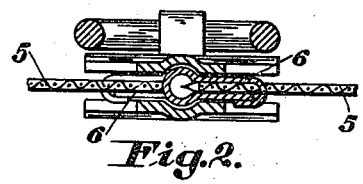
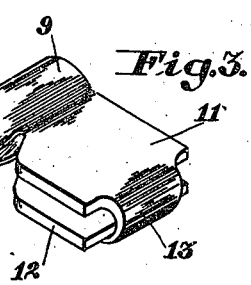
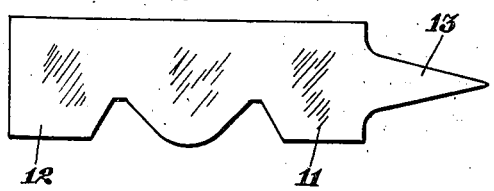
INVENTOR.
Otto von der Heyde
BY Kelley & Chisholm
ATTORNEYS.

Patented Aug. 11, 1936

2,050,869

UNITED STATES PATENT OFFICE 2,050,869

SEPARABLE INTERLOCKING FASTENER

Otto von der Heyde, Meadville, Pa., assignor to Hookless Fastener Company, a corporation of Pennsylvania Application November 15, 1933, Serial No. 698,133

5 Claims. (Cl. 24—205)

My invention relates to separable interlocking fasteners and more particularly to the fastening devices comprising a pair of flexible strips having cooperating series of fastener elements arranged in closely spaced relation on the edges of the strips, such elements being engaged or disengaged by a slider which is mounted to move over the elements.

Some of the objects of my invention are to provide a light weight fastener which will be economical to produce and which will be satisfactory for many of the uses to which slide fasteners are now applied, to construct the fastener elements from thin sheet metal and to have each element occupy a greater space on the tape so that fewer elements will be required to make a given length of fastener; to avoid the necessity of preparing a special beaded edge to receive the fastener elements; to make a compact construction having the advantage of the slider riding directly on the interlocking ends of the elements and not rubbing against the mounting strips.

In the accompanying drawing, I have shown for purposes of illustration, one embodiment which my invention may assume in practice. In this drawing:

Fig. 1 is a plan view of a fastener constructed in accordance with my invention;

Fig. 2 is a cross-section on line 2—2 of Fig. 1;

Fig. 3 is a perspective view of a detached fastener element; and

Fig. 4 shows the sheet metal blank from which the fastener element is made.

In Fig. 1 the mounting members 5 are flat tapes without any special corded edge such as is usually required for securing the fastener elements in place. The fastener elements 6 are attached in staggered relation to the adjacent edges of the tapes and are engaged and disengaged by means of the slider 7, which is operated by the pull tab 8. Each fastener element has an interlocking end 9 of hollow cylindrical form open at one end, and having a pointed end 10 adapted to engage in the open end of an element in the opposite series when the fastener is interlocked.

Referring to Fig. 3, it will be noted that each of the fastener elements is formed from a piece of sheet metal bent upon itself to form the hollow cylindrical portion 9 and relatively thin flat metal extensions 11, 12, adapted to engage on opposite sides of the flat tape as shown in Fig. 2. One of these flat metal extensions has a pointed end 13, shown more clearly in Fig. 4, which pierces through the tape and is clinched over the opposite flat extension, as shown in Fig. 2.

It will be seen in Fig. 4 that the flat metal blank from which the fastener elements are formed is of generally rectangular cross-section with notches in one side. When the blank is bent upon itself the cylindrical interlocking portion is made from the central part of the blank and the notches divide the pointed end 10 from the flat extensions. In other words, the flat attaching portions are substantially as wide as the overall length of the interlocking portion. This is desirable in order that there will not be too much tape between fastener elements. While the stringers are quite flexible, a certain degree of resistance to relative twisting of the fastener elements is desirable in order that they may enter the cylinder properly. This can be controlled by varying the space between the fastener elements.

While I have shown and described in this application, one embodiment which my invention may assume in practice, it will be understood that this embodiment is merely for the purposes of illustration and description and that various other forms may be devised within the scope of my invention as defined in the appended claims.

What I claim as my invention is:

1. In a fastening device of the class described, a pair of flat tapes of uniform thickness throughout their width, cooperating series of fastener elements on the adjacent edges of said tapes, each element comprising a thin, flat, sheet metal member whose width is several times its thickness bent upon itself and having the ends overlapping the flat edge of said tape, one of said ends having a pointed extension piercing the tape and bent over the opposite end for securing the fastener element firmly to the tape, and interlocking means formed at the bend projecting away from the edge of the stringer.

2. A fastening device of the class described comprising a pair of flat tapes of uniform thickness throughout their width, cooperating series of fastener elements along the adjacent edges of said tapes, each of said elements consisting of an elongated, thin, sheet metal member whose width is several times its thickness, and having interlocking portions projecting from the edges of said tape, and engaging each other along the longitudinal central line of the fastening device, each element having thin sheet metal anchorage portions extending in parallel relation from the interlocking portion of each element on opposite sides of and secured to one of the tapes, and a slider embracing said interlocking portions and sliding over said anchorage portions for opening and closing the fastener so that said anchorage portions extend through the sides of the slides.

3. A fastening device of the class described comprising a pair of flat tapes, cooperating series of fastener elements attached to adjacent edges of said tapes, each of said fastener elements being formed from a flat sheet metal blank of generally rectangular shape having notches in one side, said blank being bent upon itself into the form of a cylinder at the bend with a pointed conical extension, and the end of said blank forming flat extensions from said cylinder, said notches serving to separate said pointed end from said flat extensions, and means on said flat extensions for anchoring the fastener element to the tape.

4. A fastening device of the class described comprising a pair of tape stringers, interlocking series of fastener elements along the edges of said stringers, each element being formed from a thin sheet metal blank bent upon itself to provide parallel end portions on opposite sides of the tape and a hollow enlarged portion at the bend, the walls of said enlarged portion being spaced apart a greater distance than the parallel end portions and cut away from said parallel extensions along one edge to provide a pointed end or prong adapted to interlock in the space within the bend of a corresponding member on the opposite series, and means for clinching said end portions to the tape.

5. A fastening device of the class described comprising a pair of flat tapes of uniform thickness throughout their width, cooperating series of fastener elements attached to adjacent edges of said tapes, each of said fastener elements being formed of a flat sheet metal blank of generally rectangular shape bent double to provide parallel extensions on opposite sides of the flat tape, means on said extensions providing a secure connection to said tape, said fastener element having a hollow enlarged portion at the bend which has walls spaced apart a greater distance than the parallel extensions, said hollow portion projecting a substantial distance from the edge of the stringer, the bent portion having notches in one side thereof, the material adjacent to said notches at the bend being formed to provide a prong adapted to engage in the space between the bent sides of a corresponding member on the opposite series.

OTTO VON DER HEYDE.